United States Patent
Shaw, Jr.

(10) Patent No.: US 10,912,260 B1
(45) Date of Patent: Feb. 9, 2021

(54) ADAPTABLE PLANTER SYSTEM

(71) Applicant: Crawford Shaw, Jr., Fort Worth, TX (US)

(72) Inventor: Crawford Shaw, Jr., Fort Worth, TX (US)

(73) Assignee: In The Black Revocable Trust, Denison, TX (US)

( * ) Notice: Subject to any disclaimer, the term of this patent is extended or adjusted under 35 U.S.C. 154(b) by 255 days.

(21) Appl. No.: 15/877,817

(22) Filed: Jan. 23, 2018

(51) Int. Cl.
*A01G 9/02* (2018.01)
*G09F 17/00* (2006.01)

(52) U.S. Cl.
CPC .............. *A01G 9/02* (2013.01); *G09F 17/00* (2013.01)

(58) Field of Classification Search
USPC ................... 47/66.6, 65, 65.5, 39, 41.14, 47
See application file for complete search history.

(56) References Cited

U.S. PATENT DOCUMENTS

| | | | | |
|---|---|---|---|---|
| 585,486 A * | 6/1897 | Snow | ...................... | E04H 12/32 47/41.14 |
| 1,448,808 A * | 3/1923 | McGowan | ............... | A47G 7/06 47/41.01 |
| 1,846,433 A * | 2/1932 | Morley | .................... | A01G 9/02 47/41.14 |
| 1,879,220 A * | 9/1932 | Harmony | ................. | A01G 9/02 47/41.14 |
| 2,113,688 A * | 4/1938 | Grant | ....................... | A01G 9/12 47/41.01 |
| 2,372,073 A * | 3/1945 | Flournoy | ............... | A01D 46/22 248/149 |
| 2,734,312 A * | 2/1956 | Vaghi | ...................... | A47G 7/06 47/41.01 |
| 2,842,181 A * | 7/1958 | Machac | ................. | B21D 53/20 411/165 |
| 4,102,081 A * | 7/1978 | Morrow | ................... | A01G 9/02 47/67 |
| 4,593,490 A | 6/1986 | Bodine | | |
| 5,438,797 A * | 8/1995 | Lendel | .................... | A01G 9/023 47/39 |
| 5,450,692 A * | 9/1995 | Ruibal | ................... | A01G 9/023 47/39 |
| 5,727,347 A * | 3/1998 | Sellers | ..................... | A01G 9/04 47/67 |
| 5,743,044 A * | 4/1998 | Hopkins | ................ | A47G 7/047 47/67 |
| 6,128,855 A * | 10/2000 | Salamh | .................... | A01G 5/04 47/41.01 |
| 6,149,119 A * | 11/2000 | O'Connell | ............. | A47G 7/025 248/146 |

(Continued)

FOREIGN PATENT DOCUMENTS

DE 201420102995 7/2014
FR 9913946 A 11/1999
(Continued)

*Primary Examiner* — Andrea M Valenti
(74) *Attorney, Agent, or Firm* — Eversheds Sutherland (US) LLP

(57) ABSTRACT

An adaptive planter system enables a container in which plants grow to be secured to the ground. It also allows for use of the space above the plants in decorative, artistic or practical ways. A shaft anchors the body of the system to the ground and provides a way to attach banners, handles, figures or the like to the opposite end.

9 Claims, 9 Drawing Sheets

(56) References Cited

U.S. PATENT DOCUMENTS

| | | | |
|---|---|---|---|
| D506,160 S * | 6/2005 | Lambert | D11/148 |
| 6,983,561 B2 * | 1/2006 | Warren | A47G 7/041 47/39 |
| D791,014 S * | 7/2017 | Hoffman | D11/148 |
| 2008/0115414 A1 | 5/2008 | Hogan | |
| 2009/0293355 A1 * | 12/2009 | Clouston | A01G 9/02 47/67 |
| 2012/0227316 A1 * | 9/2012 | Ptak | A01G 9/02 47/32.3 |
| 2014/0366436 A1 * | 12/2014 | Brodeur | A47G 7/025 47/39 |

FOREIGN PATENT DOCUMENTS

| | | |
|---|---|---|
| KR | 20130001866 U | 3/2013 |
| KR | 20130105353 A | 9/2013 |

* cited by examiner

ADAPTABLE PLANTER SYSTEM

BACKGROUND

1. Field of the Invention

The present invention relates generally to horticulture systems, and more specifically, to flower pots and containers that allow for plants to grow separate from their common biome or habitat.

2. Description of Related Art

Horticulture systems are well known in the art and are effective means to improve or facilitate the growing of plants. For example, FIG. 1 depicts a conventional flower pot 101 having a container 103 filled with soil 105 with a flower 107 rooted therein. During use, water, fertilizer or the like is added to the soil 105 so that flower 107 can grow.

One of the problems commonly associated with flower pot 101 is limited use. For example, the pot 101 commonly rests on the ground raising the center of gravity making the pots more prone to falling over and ruining what is growing.

In addition, the space above the flower pot 103 is difficult if not impossible to use for other purposes.

Accordingly, although great strides have been made in the area of flower pots, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
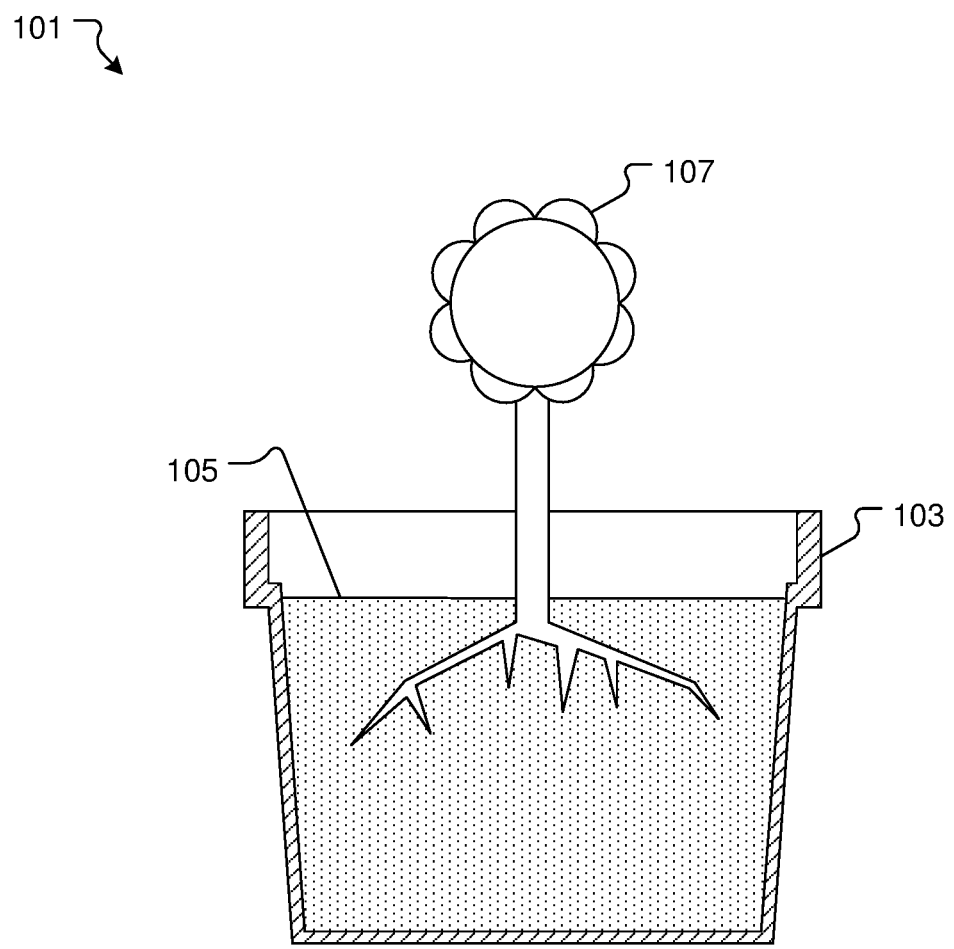
FIG. 1 is a front view of a common flower pot.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional flower pots. Specifically, the invention of the present application enables the container holding the plants to be anchored to the ground to prevent the container from tipping. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
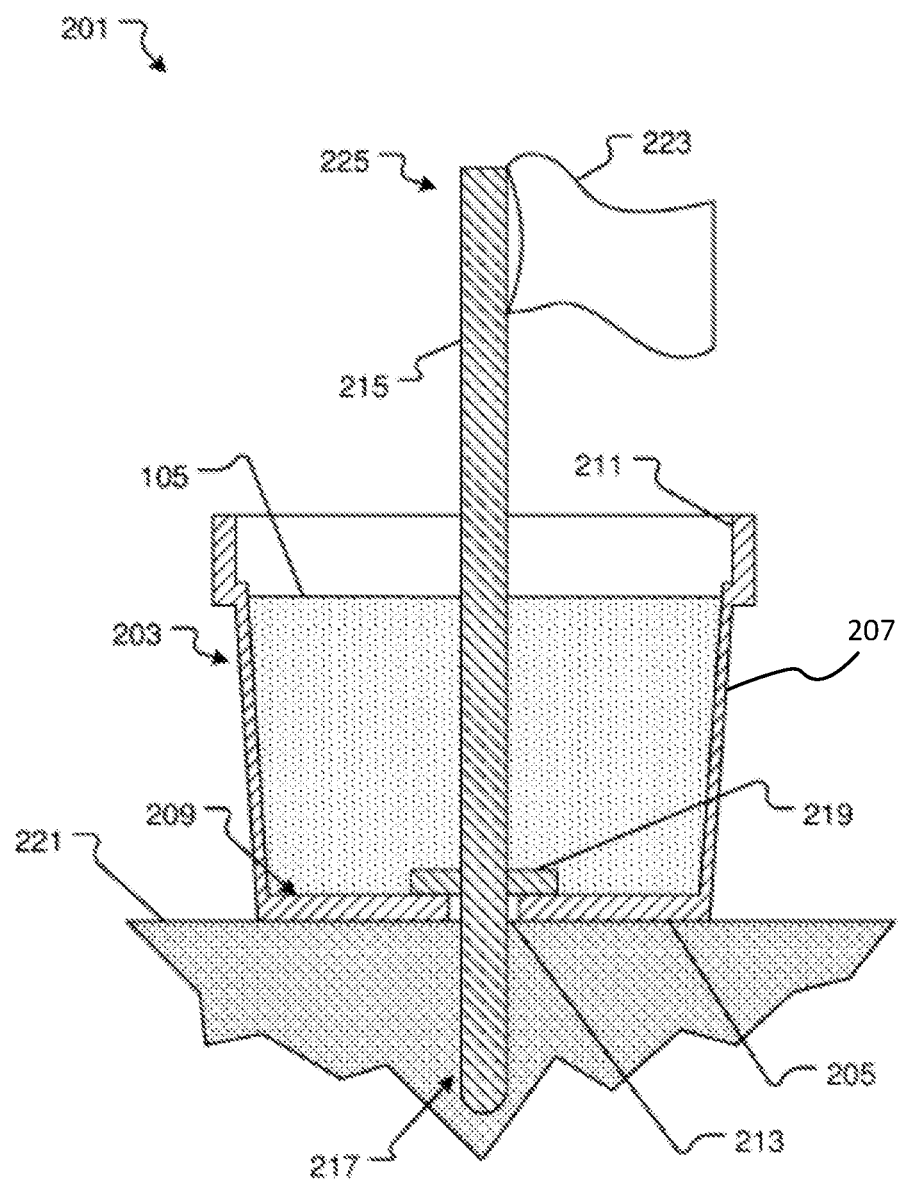
FIG. 2 is a cross-sectional front view of an adaptable planter system in accordance with a preferred embodiment of the present application.

Referring now to the drawings wherein like reference characters identify corresponding or similar elements throughout the several views, FIG. 2 depicts a cross-sectional front view of an adaptable planter system in accordance with a preferred embodiment of the present application. It will be appreciated that system 201 overcomes one or more of the above-listed problems commonly associated with conventional flower pots.

In the contemplated embodiment, system 201 includes body 203 having a base 205 with a wall 207 attached to the top surface 209 thereof, the space 211 inside the wall 207 being configured to hold soil 105. The base 205 having a hole 213 passing therethrough. The system also including a shaft 215 where one end 217 has a flange 219 attached so that when the end 217 passes through the hole 213 the flange 219 presses the base 205 to the ground 221. The shaft 215 having a banner 223 attached to the opposite end 225.

It should be appreciated that one of the unique features believed characteristic of the present application is that the flange 219 of the shaft 215 and the base 205 anchor the system 201 to the ground 221 so that the system 201 does not tip over or spill.

Another unique feature believed characteristic of the present application is that the shaft 215 supports decorative or informative items like banner 223 so that the space above the system is able to be used.

It will also be appreciated that the body 203 also serves to contain the roots of a plant growing in the soil 105, this is particularly important in locations such as graveyards and gravesites to stop the root system from encroaching into another owner's plot.

While a flange 219 has been depicted as the securing means whereby the system 201 is attached to the ground 221 or the shaft 215 to the body 203, any other means such as fasteners, pins or the like is contemplated.

Figure 3:
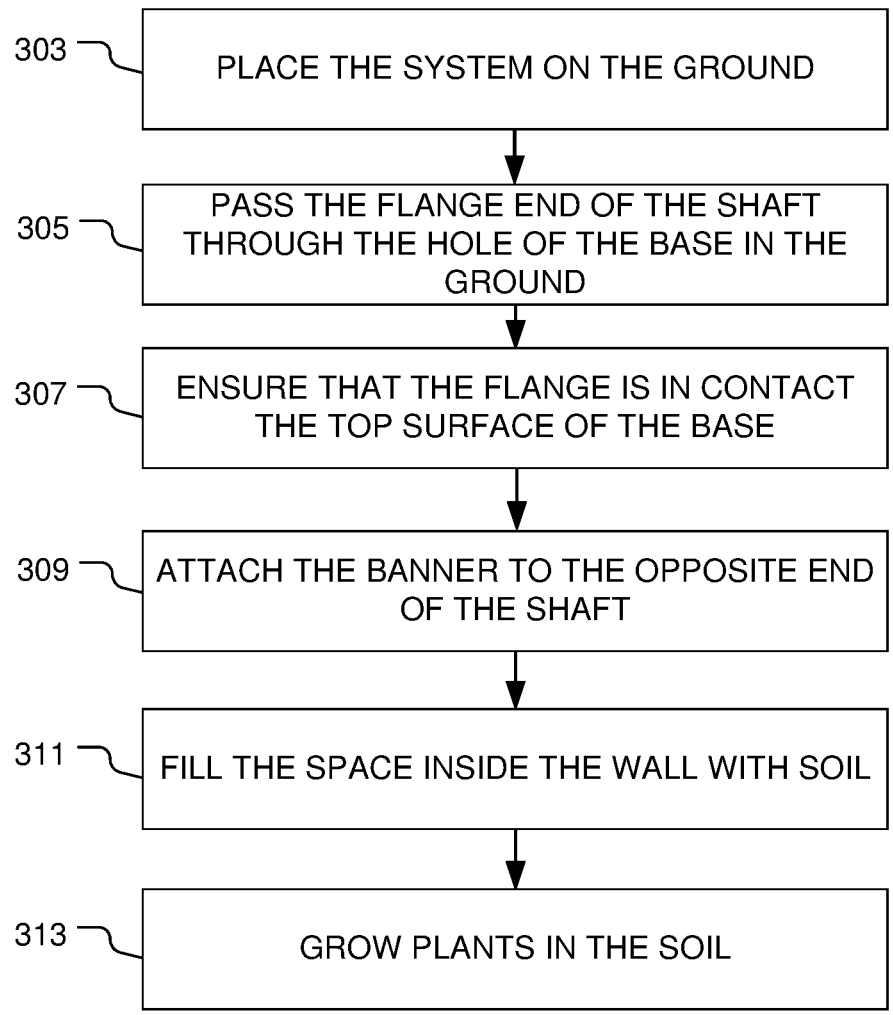
FIG. 3 is a flowchart of the preferred method of use of the system of FIG. 2.

Referring now to FIG. 3 the preferred method of use of the system 201 is depicted. Method 301 including placing the system on the ground 303, passing the flange end of the shaft through the hole of the base and in the ground 305, ensuring that the flange is in contact with the top surface of the base 307, attaching the banner to the opposite end of the shaft 309, filling the space with soil 311 and growing plants in the soil 313.

Figure 4:
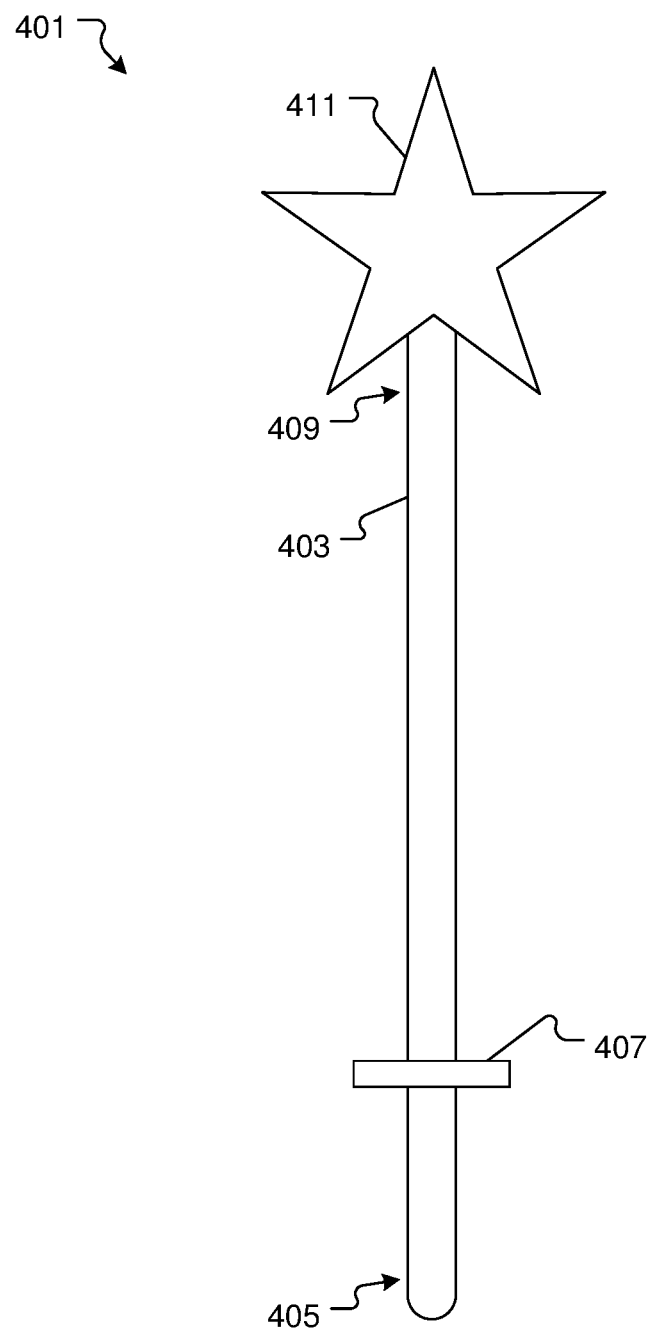
FIG. 4 is a cross-sectional front view of an alternative embodiment of the shaft of FIG. 2.

It will be appreciated that while a banner 223 has been depicted and discussed that other methods of use for the protruding end of the shaft 215 have been contemplated as depicted in FIG. 4. Embodiment 401 including a body 403 having a flange end 405 with a flange 407 attached some distance from then end 405 and a decorative end 409 having a figure 411 attached thereto.

It will be appreciated that through figure 411 symbols or other artistic expressions can be located above what is growing in the soil 105 of the system 201.

Figure 5:
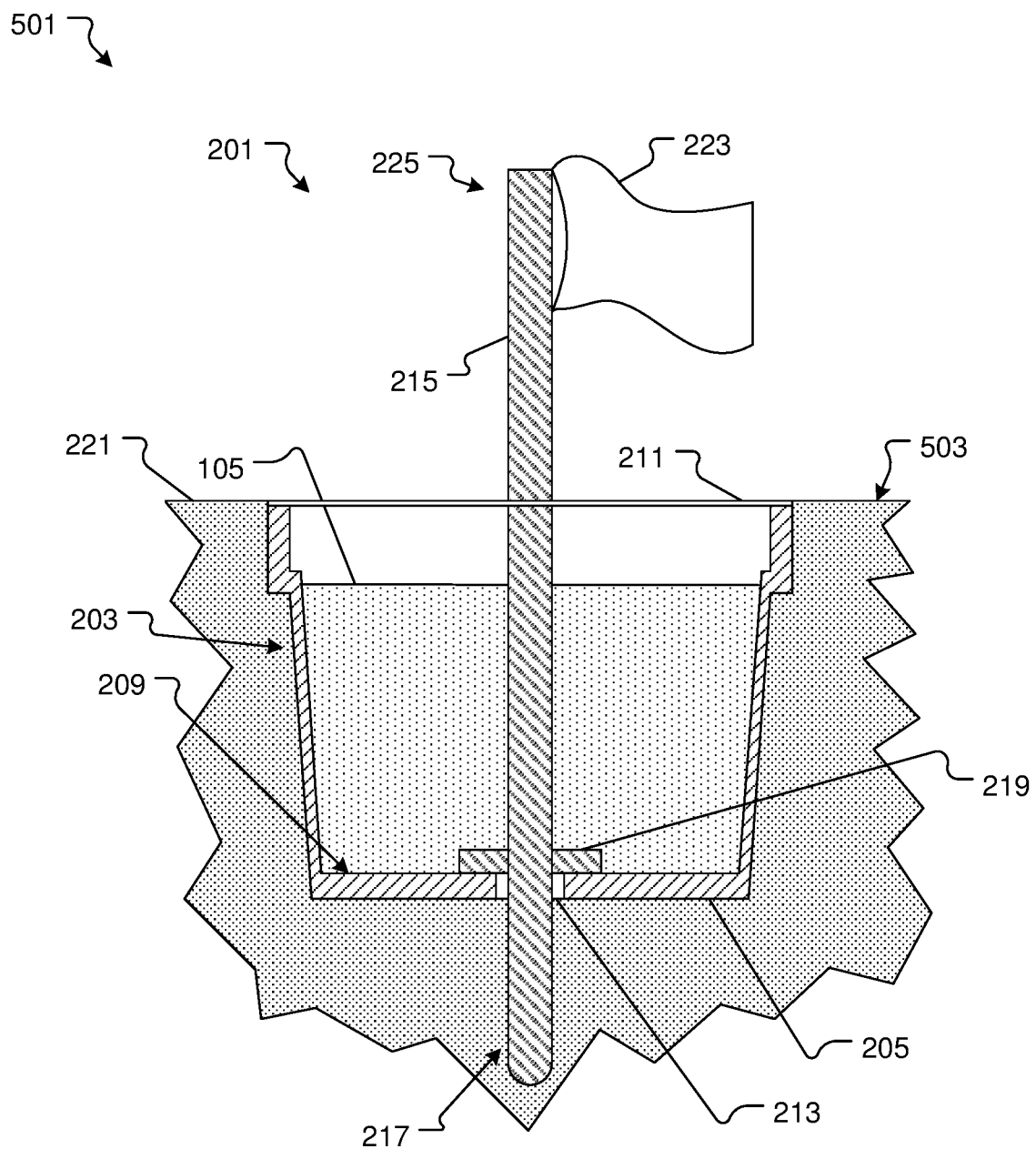
FIG. 5 is a cross-sectional front view of an alternative embodiment of the system of FIG. 2.

Referring now to FIG. 5 an alternative embodiment of the system 201 is depicted. The embodiment 501 including similar features as system 201 but where the body 203 has been placed below the surface 503 of the ground 221. It will be appreciated that to care for grass or other maintenance needs of the ground 221 the body 203 must be below the surface 503. It will further be appreciated that having the shaft 215 be removable from the body 203 enables the care and maintenance of the ground 221 around the system 201.

Figure 6A:
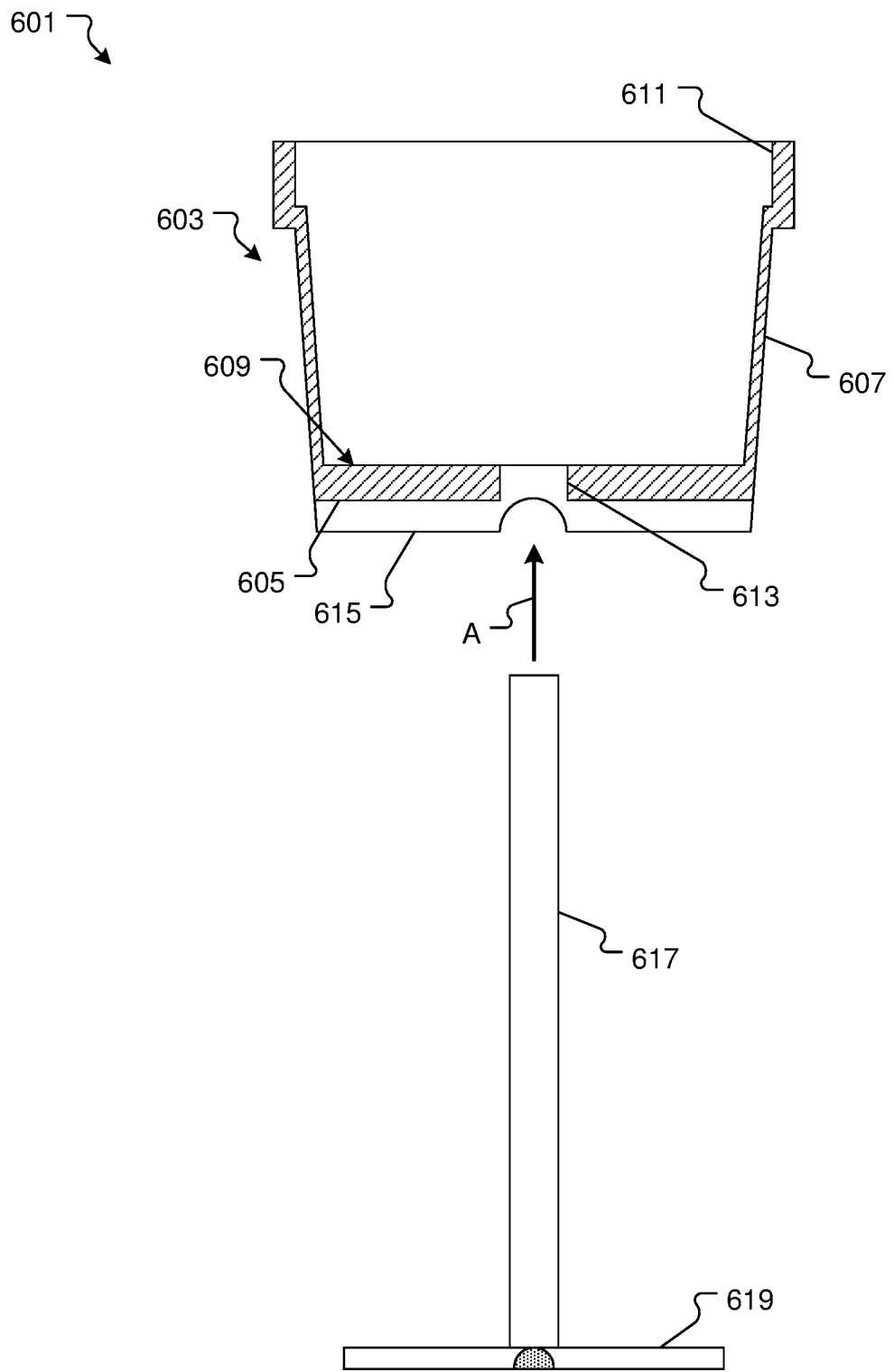
FIGS. 6A and 6B are cross-sectional front views of an alternative embodiment of the system of FIG. 2.
Figure 6B:
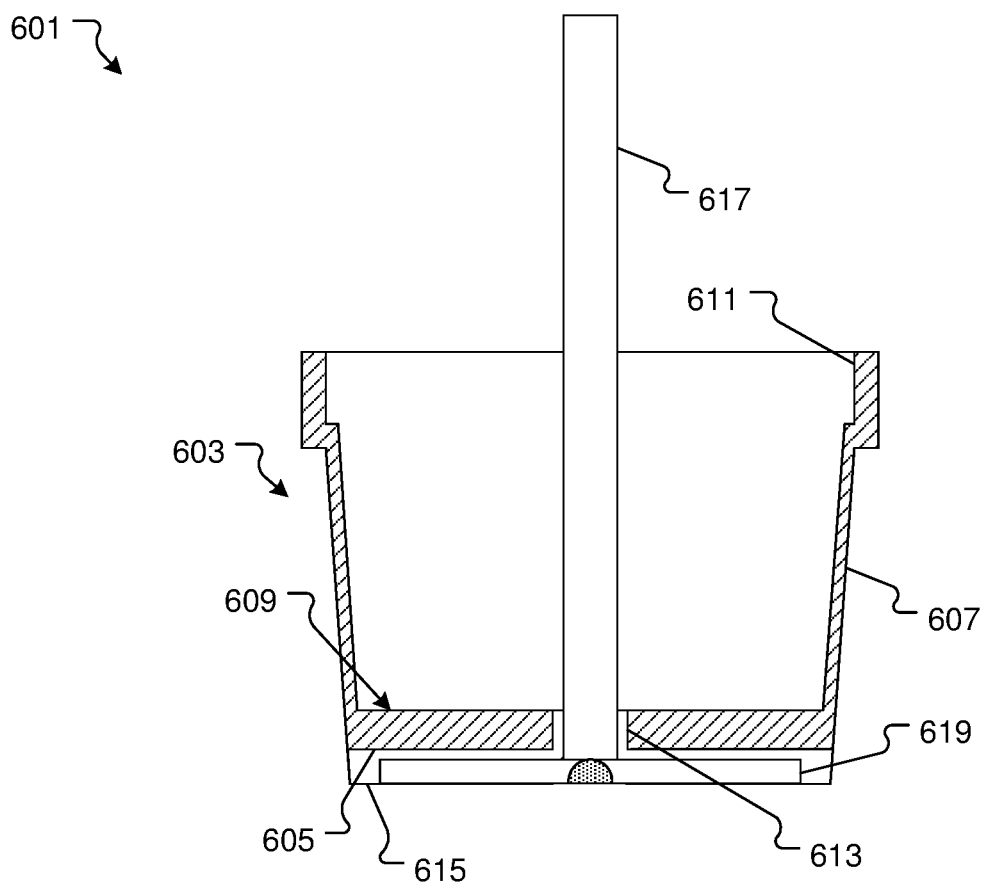

It will be understood that the system will not always be used on ground that is penetrable by the shaft 215, therefor it will be appreciated that in embodiment 601 the system can be placed on a hard surface as depicted in FIGS. 6A and 6B. Embodiment 601 including a body 603 having a base 605 with a wall 607 attached to the top surface 609 thereof, the space 611 inside the wall 607 being configured to hold soil. The base 605 having a hole 613 passing therethrough. The base also having a recess 615 extending from the bottom partially toward the upper surface 609.

Figure 7:
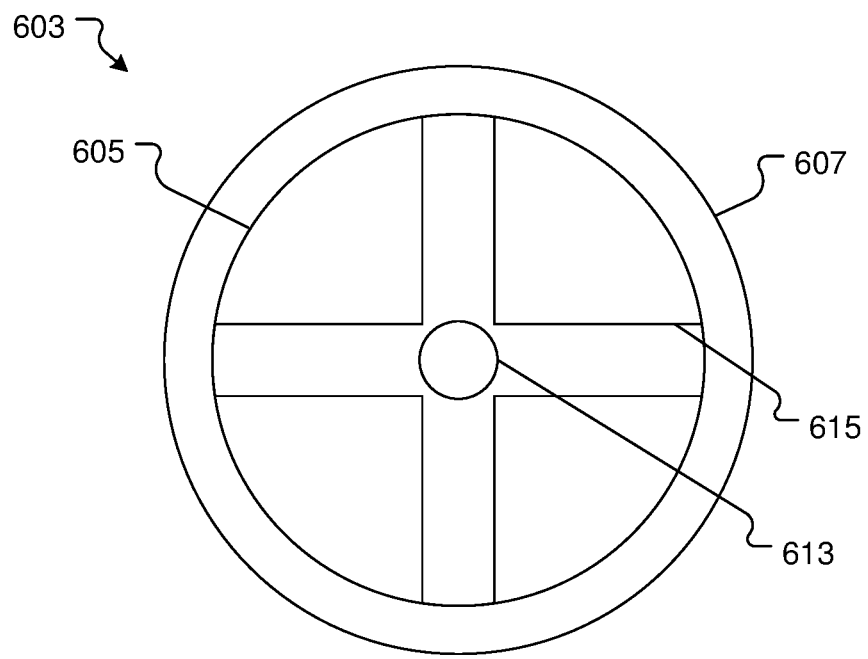
FIG. 7 is a bottom view of the system of FIGS. 6A and 6B.

The system 601 also including a shaft 617 where one end has prongs 619 attached so that when the opposite end passes through the hole 613 as depicted by motion A, the prongs 619 rest in the recess 615 of the base 605. It will thus be appreciated that the embodiment 601 rests on a solid surface while still taking advantage of the space of the body 603. The contemplated recess 615 is depicted in FIG. 7 for clarity.

Figure 8:
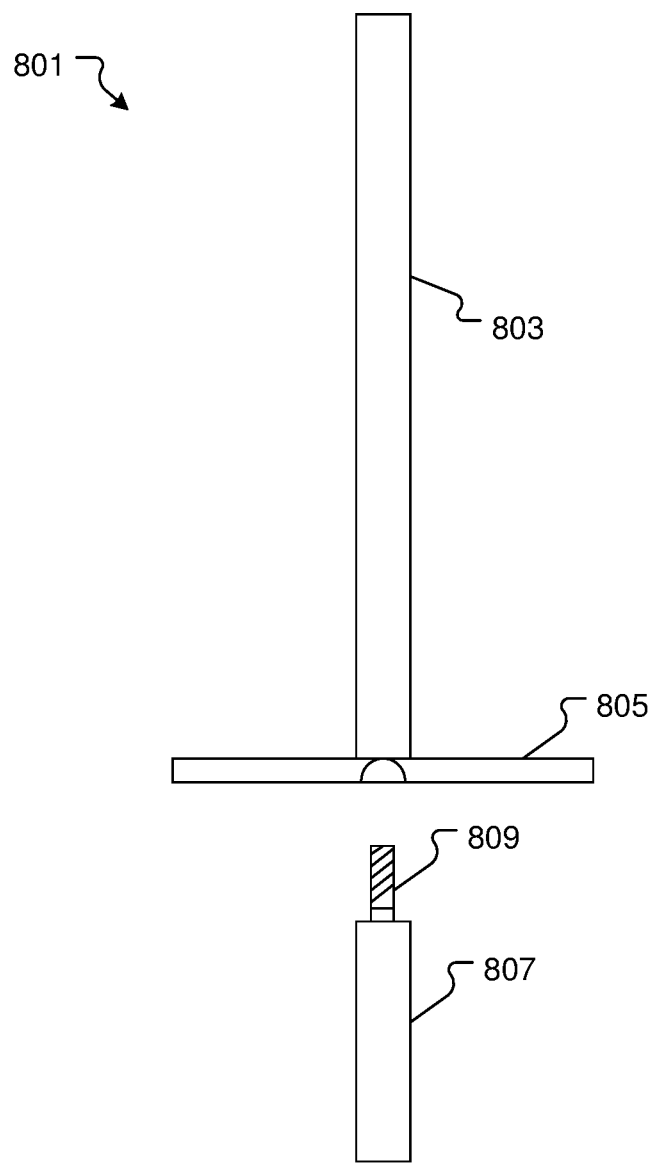
FIG. 8 is a front view of an alternative embodiment of the shaft of FIG. 2.

Referring now to FIG. 8 an alternative embodiment of the shaft 215 is depicted. Embodiment 801 including a body 803 having prongs 805 attached at one end. The same end having an anchor 807 that attaches to the body via threads 809. While threads 809 have been depicted any means of attaching the anchor 807 to the body 803 is contemplated. It will be appreciated that in this manner embodiment 801 enables the same shaft to be used on penetrable ground or a hard surface.

Figure 9:
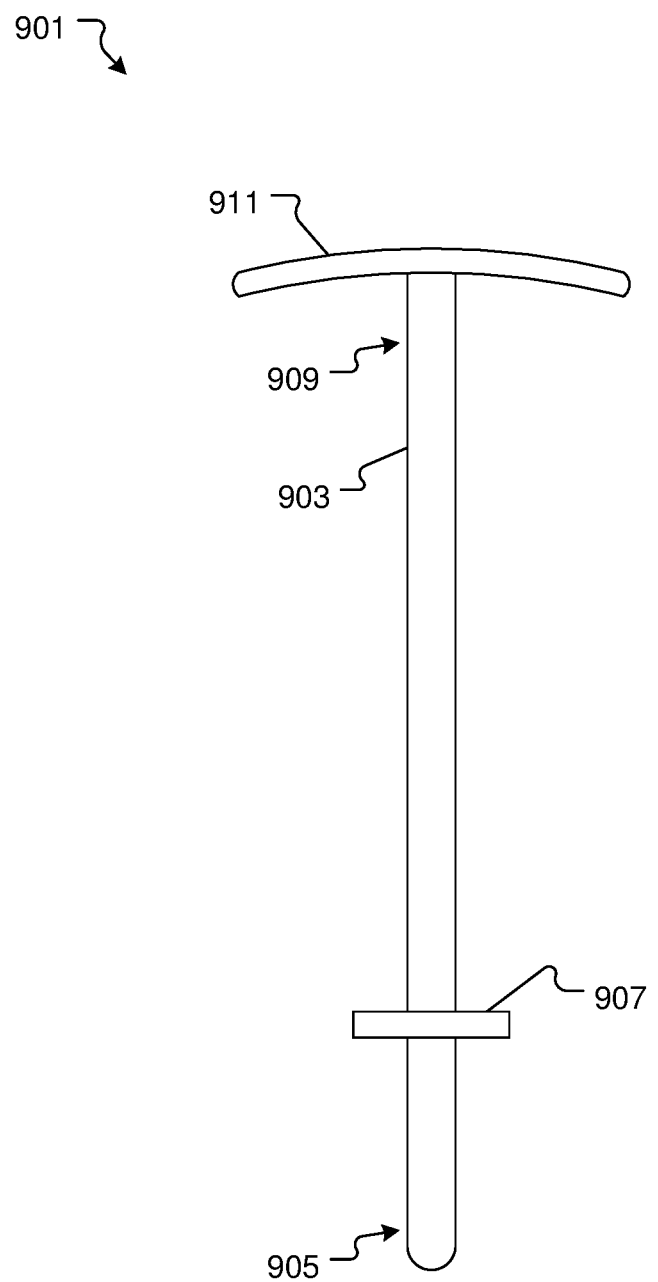
FIG. 9 is a front view of an alternative embodiment of the shaft of FIG. 2.

Referring now to FIG. 9 and alternative embodiment of the shaft 215 is depicted. Embodiment 901 including a body 903 having a flange end 905 having a flange 907 attached some distance therefrom. The opposite end 909 having handle 911 attached thereto. It will be appreciated that the handle 911 enables the removal of the shaft 901 as well as lifting of a container, pot or the like wherein it is attached.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A planter system comprising:
   a body having a base configured to support the body on a ground surface and a wall extending from the base to a top surface thereof, to define a volume within the wall for receiving plant matter, the base having a hole therethrough and defining a recess in an outer surface thereof, such that the outer surface of the base surrounding the recess provides a level surface to support the body on the ground surface;
   a shaft having a longitudinal axis, a first end, and a second end opposite the first end, the second end extending past the top surface of the wall;
   a plurality of prongs extending laterally, relative the longitudinal axis, from the shaft at or near the first end, the prongs removably positioned within the recess and outside the volume, the prongs securing the shaft to the body, such that the prongs and shaft are collectively selectively removable from the body by removing the prongs from the recess such that the second end of the shaft passes through the hole of the base; and
   a banner or figure attachment at the second end of the shaft,
   wherein the shaft is configured to anchor the body to the ground surface whereon the body is placed by passing through the hole, such that the first end of the shaft extends into the ground while the base supports the body on the ground surface, and
   wherein a first portion of the shaft that is configured to extend into the ground is removably coupled to a second portion of the shaft, such that upon removal of the first portion of the shaft, the base is capable of supporting the planter system on a solid surface with the plurality of prongs positioned within the recess, via the level surface of the outer surface of the base.

2. The system of claim 1 wherein the plurality of prongs comprises four orthogonal prongs.

3. The system of claim 1 wherein the banner or figure is selectively detachable from the second end of the shaft.

4. The system of claim 1 wherein the first portion of the shaft is removably coupled to the second portion of the shaft by a threaded fastener.

5. The system of claim 1 wherein the a banner or figure attachment at the second end of the shaft comprises a handle, the handle enabling lifting of the planter system.

6. A planter system comprising:
- a body having a base configured to support the body upright on a ground surface and a wall extending from the base to a top surface thereof, to define a volume within the wall for receiving plant matter, the base having a hole therethrough and defining a recess in an outer surface thereof, such that the outer surface of the base surrounding the recess provides a level surface to support the body on the ground surface;
- a shaft having a longitudinal axis, a first end, and a second end opposite the first end, the second end extending past the top surface of the wall, an anchor portion removably received on the first end of the shaft, wherein in use the anchor portion extends into the ground and anchors the body to the ground surface such that the outer surface of the base contacts the ground surface;
- a flange extending laterally, relative the longitudinal axis, from the shaft at or near the first end, the flange removably positioned within the recess and outside the volume, the flange securing the shaft to the body, such that the flange and shaft are collectively selectively removable from the body by removing the flange from the recess such that the second end of the shaft passes through the hole of the base; and
- a banner or figure attachment at the second end of the shaft,
- wherein, upon removal of the anchor portion from the shaft, the base is capable of supporting the planter system on a solid surface with the flange positioned within the recess, via the level surface of the outer surface of the base.

7. The system of claim 6 wherein the banner or figure is selectively detachable from the second end of the shaft.

8. The system of claim 6 wherein the first portion of the shaft is removably coupled to the second portion of the shaft by a threaded fastener.

9. The system of claim 6 wherein the a banner or figure attachment at the second end of the shaft comprises a handle, the handle enabling lifting of the planter system.

* * * * *